US012280514B2

(12) United States Patent
Kempker

(10) Patent No.: US 12,280,514 B2
(45) Date of Patent: Apr. 22, 2025

(54) HANDHELD SAFETY KNIFE

(71) Applicant: Cardinal Safety Company, LLC, Spring Lake, MI (US)

(72) Inventor: Jeffrey Allen Kempker, Spring Lake, MI (US)

( * ) Notice: Subject to any disclaimer, the term of this patent is extended or adjusted under 35 U.S.C. 154(b) by 891 days.

(21) Appl. No.: 17/373,710

(22) Filed: Jul. 12, 2021

(65) Prior Publication Data

US 2023/0008940 A1 Jan. 12, 2023

(51) Int. Cl.

*B26B 29/02* (2006.01)
*B26B 1/10* (2006.01)
*B26B 5/00* (2006.01)

(52) U.S. Cl.

CPC ................ *B26B 29/02* (2013.01); *B26B 1/10* (2013.01); *B26B 5/00* (2013.01)

(58) Field of Classification Search

None

See application file for complete search history.

(56) References Cited

U.S. PATENT DOCUMENTS 2,644,230 A * 7/1953 Anderson ............... B26B 29/02 30/2
3,648,365 A * 3/1972 Iten ......................... B26B 21/24 30/40
D246,281 S 11/1977 Ferrara
D254,243 S 2/1980 Florian
D256,883 S 9/1980 Wharmby
D265,963 S 8/1982 Murdock
D269,154 S 5/1983 Freedman
D295,365 S 4/1988 Freedman
D320,150 S 9/1991 Huang
D323,967 S 2/1992 Talbot
D377,595 S 1/1997 Wiezenthal
D381,886 S 8/1997 Domenico
D401,492 S 11/1998 Joseph, Jr.
D405,674 S 2/1999 Reidenbach
D409,071 S 5/1999 Reidenbach
D470,030 S 2/2003 Swier
D481,609 S 11/2003 Perlmutter
6,691,416 B2 2/2004 Yu Chen
D498,404 S 11/2004 Schmidt
D501,386 S 2/2005 Diaz
6,892,456 B2 5/2005 Yu Chen
D521,844 S 5/2006 Kempker
D527,604 S 9/2006 Kempker
D540,647 S 4/2007 Ireland (Continued)

*Primary Examiner* — Hwei-Siu C Payer

(74) *Attorney, Agent, or Firm* — Hultman Law PLC; Eric Andrew Hultman, Esq.

(57) ABSTRACT

A handheld safety knife is disclosed herein which comprises a removable blade cartridge installed into a handle having a cartridge recess. The cartridge recess retains the blade cartridge within the handle through one or more of the following: a contoured side wall matching that of the removable blade cartridge; a plurality of anti-rotation protrusions which are located in the cartridge recess; or a cartridge orientation feature which mates with a cavity located in the removable blade cartridge. When the blade becomes used, it may be removed and reoriented to access a fresh blade. During this blade exchange, the cartridge may be removed from the handle, but the blade is not exposed, thus yielding a safer design over that taught in the prior art.

25 Claims, 22 Drawing Sheets

(56) References Cited

U.S. PATENT DOCUMENTS

| | | | |
|---|---|---|---|
| D558,554 S | | 1/2008 | Carbonaro |
| D571,180 S | | 6/2008 | Marshall |
| D575,613 S | | 8/2008 | Jennings |
| D579,744 S | | 11/2008 | Neiser |
| D582,746 S | | 12/2008 | Neiser |
| D587,552 S | | 3/2009 | Collard |
| D590,687 S | | 4/2009 | Ireland |
| 7,533,595 B2 | | 5/2009 | Domenico |
| D593,392 S | | 6/2009 | Domonoske |
| 7,624,507 B2 | | 12/2009 | Bergstrand |
| D636,248 S | | 4/2011 | Still |
| D637,883 S | | 5/2011 | Yu Chen |
| D639,631 S | | 6/2011 | Kempker |
| 7,958,639 B2 | | 6/2011 | Ireland |
| D649,001 S | | 11/2011 | Still |
| 8,069,571 B2 | | 12/2011 | Chung |
| D660,647 S | | 5/2012 | Still |
| D660,675 S | | 5/2012 | Gringer |
| D664,417 S | | 7/2012 | Still |
| D673,440 S | | 1/2013 | Kempker |
| D682,065 S | | 5/2013 | Gringer |
| 8,549,754 B2 | | 10/2013 | Bung |
| D711,206 S | | 8/2014 | Larson |
| 8,782,909 B1 | | 8/2014 | Davis |
| D714,611 S | | 10/2014 | Yu Chen |
| D714,612 S | | 10/2014 | Gropl |
| D721,564 S | | 1/2015 | Purnomohadi |
| 9,102,068 B2 | | 8/2015 | Gringer |
| D742,715 S | | 11/2015 | Krause |
| 9,221,664 B2 | | 12/2015 | Votolato |
| D752,942 S | | 4/2016 | Rohrbach |
| 9,346,177 B2 | | 5/2016 | Mayes |
| 9,346,483 B2 | | 5/2016 | Davis |
| D761,073 S | | 7/2016 | Cox |
| D767,966 S | | 10/2016 | Standlee |
| D767,976 S | | 10/2016 | Standlee |
| 9,539,732 B2 | | 1/2017 | Hegler |
| D784,107 S | | 4/2017 | Yu Chen |
| 9,650,065 B2 | | 5/2017 | Davis |
| 9,676,106 B2 | | 6/2017 | Garavaglia |
| D801,148 S | | 10/2017 | Yu Chen |
| D802,349 S | | 11/2017 | Yu Chen |
| D807,142 S | | 1/2018 | Hyma |
| D817,142 S | | 5/2018 | Rohrbach |
| D817,143 S | | 5/2018 | Rohrbach |
| 9,956,695 B2 | | 5/2018 | Chung |
| 9,969,091 B2 | | 5/2018 | Jacobs |
| 10,086,521 B2 | | 10/2018 | Huang |
| 10,093,026 B2 | | 10/2018 | Garavaglia |
| D833,848 S | | 11/2018 | Davis |
| D837,626 S | | 1/2019 | Rohrbach |
| 10,279,491 B2 | | 5/2019 | Scimone |
| 10,315,325 B2 | | 6/2019 | Votolato |
| D852,607 S | | 7/2019 | Hyma |
| 10,350,775 B2 | | 7/2019 | Jacobs |
| 10,377,619 B2 | | 8/2019 | Votolato |
| 10,391,655 B2 | | 8/2019 | Votolato |
| D859,121 S | | 9/2019 | Zahorski |
| D863,924 S | | 10/2019 | Nguyen |
| 10,442,093 B2 | | 10/2019 | Jacobs |
| D867,097 S | | 11/2019 | Marinovich |
| D867,847 S | | 11/2019 | Marinovich |
| 10,493,645 B2 | | 12/2019 | Marinovich |
| D873,642 S | | 1/2020 | Yu Chen |
| 10,618,188 B1 | | 4/2020 | Davis |
| 10,668,638 B2 | | 6/2020 | Mayes |
| 10,953,557 B2 | * | 3/2021 | Davis ...................... B26B 29/02 |
| D985,351 S | * | 5/2023 | Kempker ......................... D8/98 |
| D985,352 S | * | 5/2023 | Kempker ......................... D8/98 |
| 11,708,256 B2 | * | 7/2023 | Votolato .................... B67B 7/30<br>30/142 |
| 2010/0263219 A1 | * | 10/2010 | Kempker ............. B26B 25/005<br>83/13 |
| 2014/0013604 A1 | * | 1/2014 | Votolato .................... B67B 7/30<br>30/142 |
| 2018/0333870 A1 | | 11/2018 | Rus |
| 2019/0202074 A1 | | 7/2019 | Chernyshou |
| 2019/0240850 A1 | | 8/2019 | Scimone |
| 2019/0329435 A1 | | 10/2019 | Jacobs |
| 2020/0001485 A1 | | 1/2020 | Marshall |
| 2020/0030997 A1 | | 1/2020 | Jacobs |
| 2020/0086512 A1 | | 3/2020 | Rus |
| 2020/0101632 A1 | | 4/2020 | Seferi |
| 2020/0114530 A1 | | 4/2020 | Marinovich |
| 2020/0215708 A1 | | 7/2020 | Nguyen |
| 2023/0008940 A1 | * | 1/2023 | Kempker ................ B26B 29/02 |
| 2024/0017433 A1 | * | 1/2024 | Takashima ............. B26B 5/005 |

* cited by examiner

HANDHELD SAFETY KNIFE

BACKGROUND OF THE INVENTION

Field of the Invention

The present invention generally relates to handheld knifes, more specifically handheld safety knifes and particularly to handheld safety knifes having a blade contained within a replaceable blade cartridge.

Description of the Related Art

Knives are cutting devices which typically comprise a blade and a handle. In most forms of knives, the handle anchors and retains the blade. This handle portion is then gripped by the end user and the blade is brought into contact with an article to be cut. This arrangement is common and well known in the art.

Safety knives are a special form of knives that contain one or more safety devices which make it more difficult for the end user to come into contact with the cutting portion of the blade. Various forms of safety knives exist and most forms have some sort of cover, guard, or other device which prevents the user from interacting with the cutting edge. One manner of protecting a user from the blade is to place the cutting portion of the blade in a channel which is sized to be smaller than the width of the average user's finger. This prevents insertion of the finger into the channel far enough to be cut, but allows more narrow materials, such as cardboard or paper to pass into the channel and interact with the cutting edge.

Most prior art designs fall into two principal design paths; removable blades or over-molded blades. For designs with removable blades, the safety features of the knife are opened or disassembled in order to exchange a used blade for a fresh blade. This presents a safety risk while the device is open, as the safety features are disabled and the cutting edge of the blade is left exposed to the user. One such design of an exchangeable blade would include a safety razor. When the safety razor is disassembled, it allows the user to have full interaction with the razor blade as the entirety of the blade is exposed. This has an obvious disadvantage in that the safety features are defeated during blade exchange. One solution to this issue is to prevent blade exchange altogether by using plastic to over-mold the blade right into the handle. When this style of safety knife dulls, it is simply disposed of. While this eliminates the contact issue between the end user and the cutting edge, it also greatly increases waste products by repeatedly disposing of the entirely of the knife when only the blade is dull. This waste issue is further exacerbated by the fact that over molded products can be difficult to recycle since they mix mediums such as the steel blades with plastic requiring mechanical separation prior to recycling.

The invention described herein solves these disadvantages by providing a handheld safety knife comprised of a handle portion and a replaceable blade cartridge. The inventive handheld safety knife retains its safety characteristics during blade exchange, and allows for the handle portion to be reused when the blade cartridge is exhausted.

SUMMARY OF THE INVENTION

The handheld safety knife comprises a removable blade cartridge having a cartridge body and at least one fixed blade. This blade cartridge is removably attached to a handle having a cartridge recess sized to retain the removable blade cartridge. When assembled, the fixed blade of the blade cartridge is positioned to extend away from the handle allowing the end user to cut articles using the fixed blade.

In another form of the invention the handheld safety knife comprises a removable blade cartridge having a cartridge body and at least one fixed blade. This blade cartridge is removably attached to a handle having a cartridge recess sized to retain the removable blade cartridge. When assembled, the fixed blade of the blade cartridge is positioned to extend away from the handle allowing the end user to cut articles using the fixed blade. In this form of the invention, the cartridge recess comprises a side wall which has a complimentary contour to at least one portion of the removable blade cartridge. This complimentary contour cradles the contacted portion of the removable blade cartridge and assists its retention. A second form of retention is also present in this design and comprises a cartridge orientation feature located in the cartridge recess. This cartridge retention feature is a physical protrusion which is sized to mate with a corresponding cavity that is placed into the cartridge body of the removable blade cartridge.

In yet another form of the invention the handheld safety knife comprises a removable blade cartridge having a cartridge body and at least one fixed blade terminating in a blade guard located at an end portion of the blade. The spacing between the cartridge body and the blade guard forms a cutting channel which guides material to be cut into the blade. The blade cartridge is removably attached to a handle having a cartridge recess sized to retain the removable blade cartridge. When assembled, the fixed blade of the blade cartridge is positioned to extend away from the handle thereby allowing the end user to cut articles using the fixed blade. In this form of the invention, the cartridge recess has a side wall which has a complimentary contour to at least one portion of the removable blade cartridge. This complimentary contour cradles the contacted portion of the removable blade cartridge and assists its retention. A second form of retention is also present in this design and uses a plurality of anti-rotation protrusions which engage the blade guard, the cartridge body, and the blade itself preventing it from moving within the cartridge recess.

In still another form of the invention the handheld safety knife comprises a removable blade cartridge having a cartridge body and at least one fixed blade terminating in a blade guard located at an end portion of the blade. The spacing between the cartridge body and the blade guard forms a cutting channel which guides material to be cut into the blade. The blade cartridge is removably attached to a handle having a cartridge recess sized to retain the removable blade cartridge. When assembled, the fixed blade of the blade cartridge is positioned to extend away from the handle allowing the end user to cut articles using the fixed blade. In this form of the invention, the cartridge recess has a side wall with a complimentary contour to at least one portion of the removable blade cartridge. This complimentary contour cradles the contacted portion of the removable blade cartridge and assists its retention. A second form of retention is also present in this design and comprises a cartridge orientation feature located in the cartridge recess. This cartridge retention feature is a protrusion which is sized to mate with a cavity that is placed into the cartridge body of the removable blade cartridge. A third form of retention is also present in this design and comprises a plurality of anti-rotation protrusions which engage the blade guard, the cartridge body, and the blade itself thereby preventing it from moving within the cartridge recess.

BRIEF DESCRIPTION OF THE DRAWING FIGURES

Other advantages of the present invention will be readily understood by reference to the following detailed description in connection with the accompanying drawings wherein.

DESCRIPTION OF THE VARIOUS EMBODIMENTS

Figure 1:
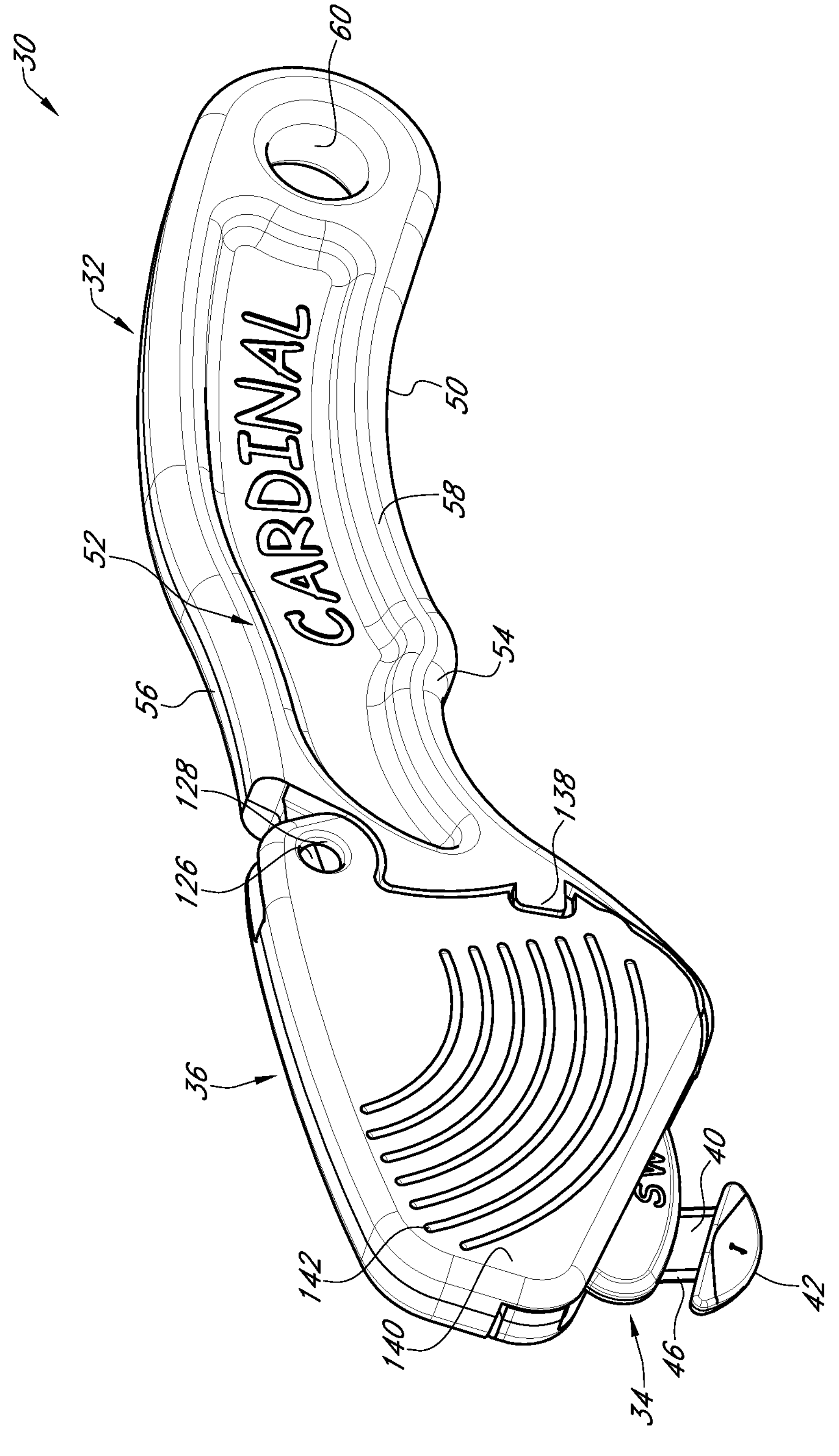
FIG. 1 is a front perspective view of a handheld safety knife having a handle, a blade cartridge, and a cover.

For purposes of the following description, the terms “upper,” “lower,” “left,” “rear,” “front,” “vertical,” “horizontal” and derivatives of such terms shall relate to the invention as oriented in FIG. 1. However, it is to be understood that the invention may assume various alternative orientations and configuration, except where expressly specified to the contrary. It is also to be understood that the device illustrated in the attached drawings and described in the following specification are simply exemplary embodiments of the inventive concepts described herein. Specific dimensions and other physical characteristics relating to the embodiments disclosed herein are not to be considered as limiting unless expressly stated otherwise.

One preferred form of a safety knife 30 is shown in FIG. 1, and comprises a handle 32, a blade cartridge 34, and an optional cover 36. As shown in this view, the blade cartridge 34 further comprises a cartridge body 38 having at least one fixed blade 40 extending therefrom. This form of the blade cartridge 34 further comprises a blade guard 42 fixed to the end of the blade 40. This arrangement creates a space between the cartridge body 38 and the blade guard 42 forming a cutting channel 44, with the blade 40 located therein. This cutting channel 44 is sized to prevent a user’s finger from being able to be inserted into the cutting channel far enough to come into contact with a cutting edge 46 located on the blade 40. In the embodiment shown in FIG. 1, this cutting channel 44 is bi-directional 48, meaning that a cutting edge 46 is located on both sides of the blade 40. The blade cartridge 34, in turn, is installed into the handle 32 in an orientation such that the blade 40 extends away from the handle, thereby allowing the safety knife 30 to cut material presented into the cutting channel 44 from either direction. This arrangement allows the end user to cut material with the safety knife 30 by either pushing or pulling the blade through the material to be cut.

The Handle Generally

The purpose of the handle is to provide a safe location for the end user to grip the safety knife 30 while using the blade cartridge 34 to cut material. One preferred form of the handle 32 is shown in FIGS. 1-4 and FIGS. 7-15 and comprises a shaft 50 having a grip 52. The grip 52 is preferably shaped to contour to a user’s hand and may further include and a finger rest 54, a thumb recess 56 or a raised edge 58, located on one or more sides of the shaft 50. A retention hole 60 may also be placed into the handle 32 and is useful to attach lanyards and other retention devices. The form and shape of the shaft 50 and the grip 52 may be varied to accommodate various hand sizes and potential end uses for the safety knife 30, but the principal function of the handle 32 is to retain both the optional cover 36 and the blade cartridge 34.

Figure 16:
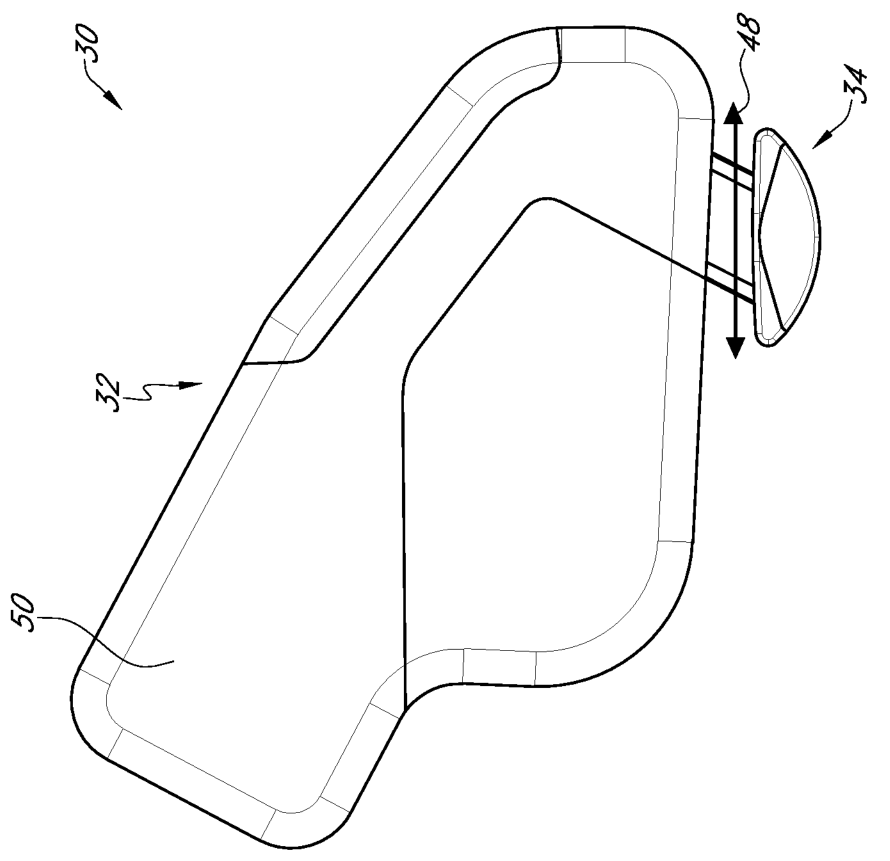
FIG. 16 is a rear view of a second embodiment of a handheld safety knife having a shorter handle shaft.
Figure 17:
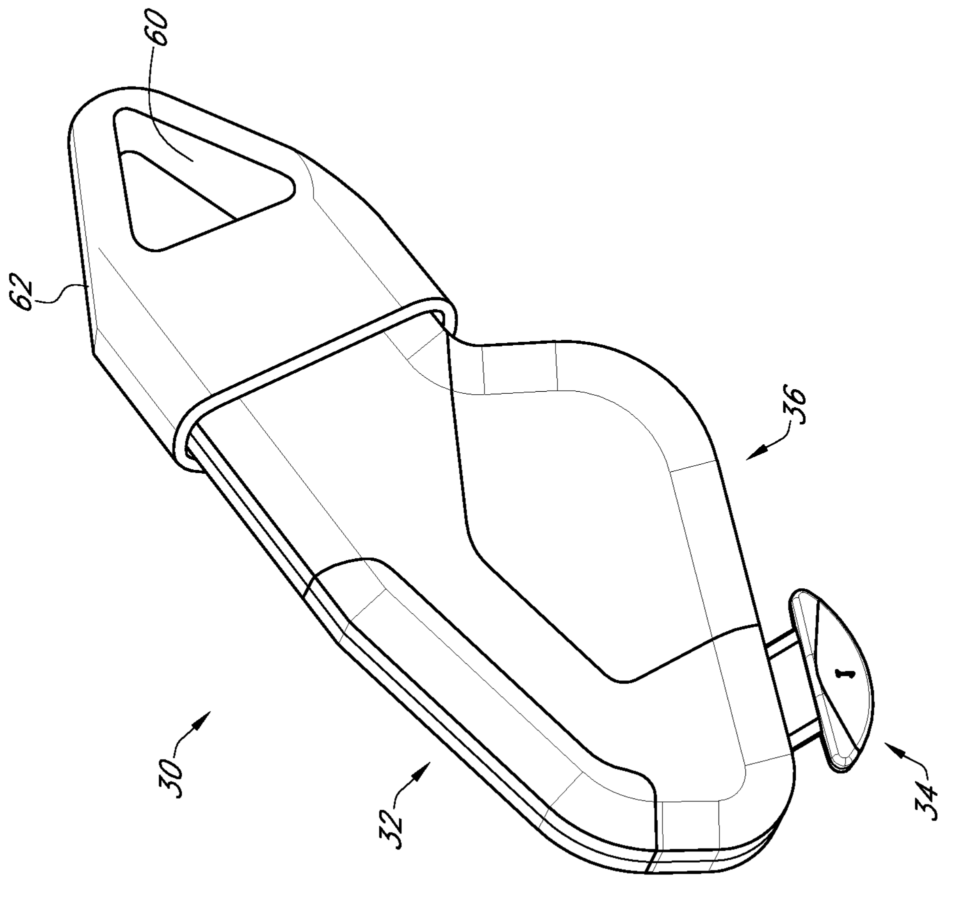
FIG. 17 is a perspective view of the handheld safety knife shown in FIG. 16, with an added end cap.
Figure 18:
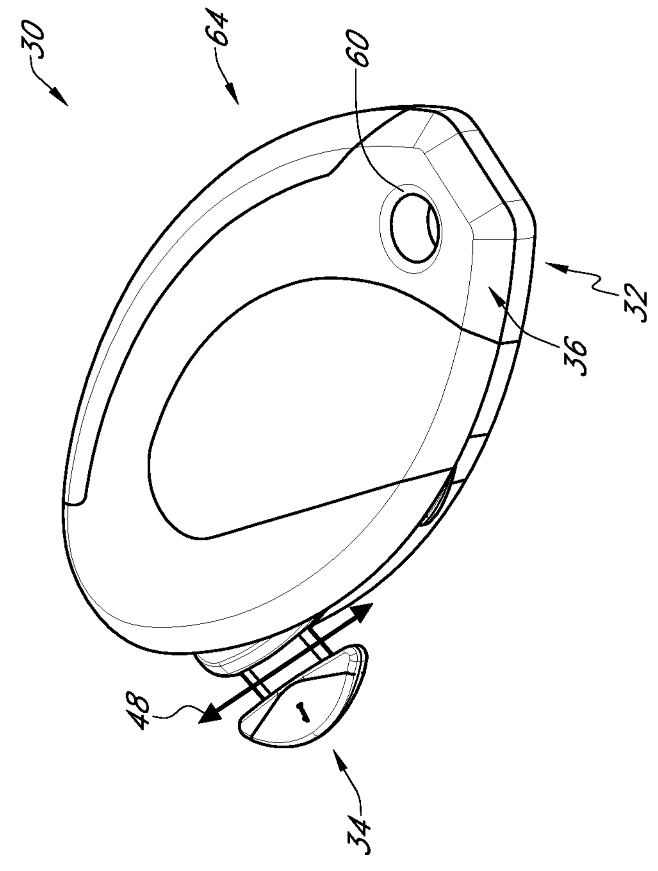
FIG. 18 is a perspective view of a third embodiment of a handheld safety knife having an oval shape.
Figure 19:
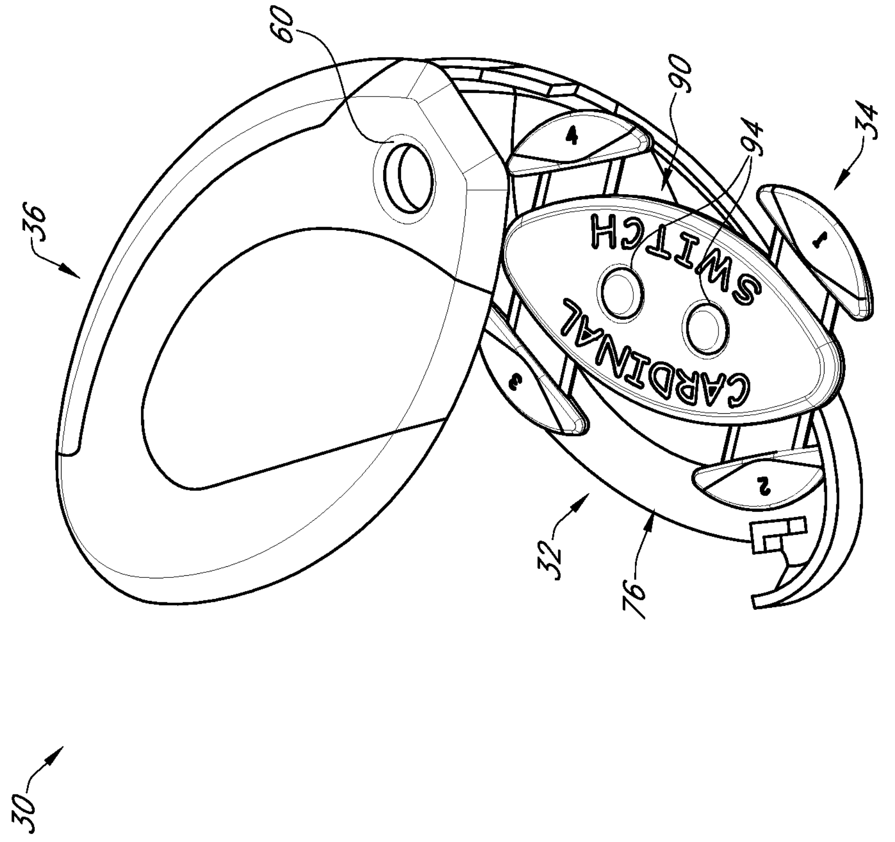
FIG. 19 is a perspective view of a third embodiment of a handheld safety knife having an oval shape, a rotating cover, and a pair of cylindrical posts located on the handle.
Figure 20:
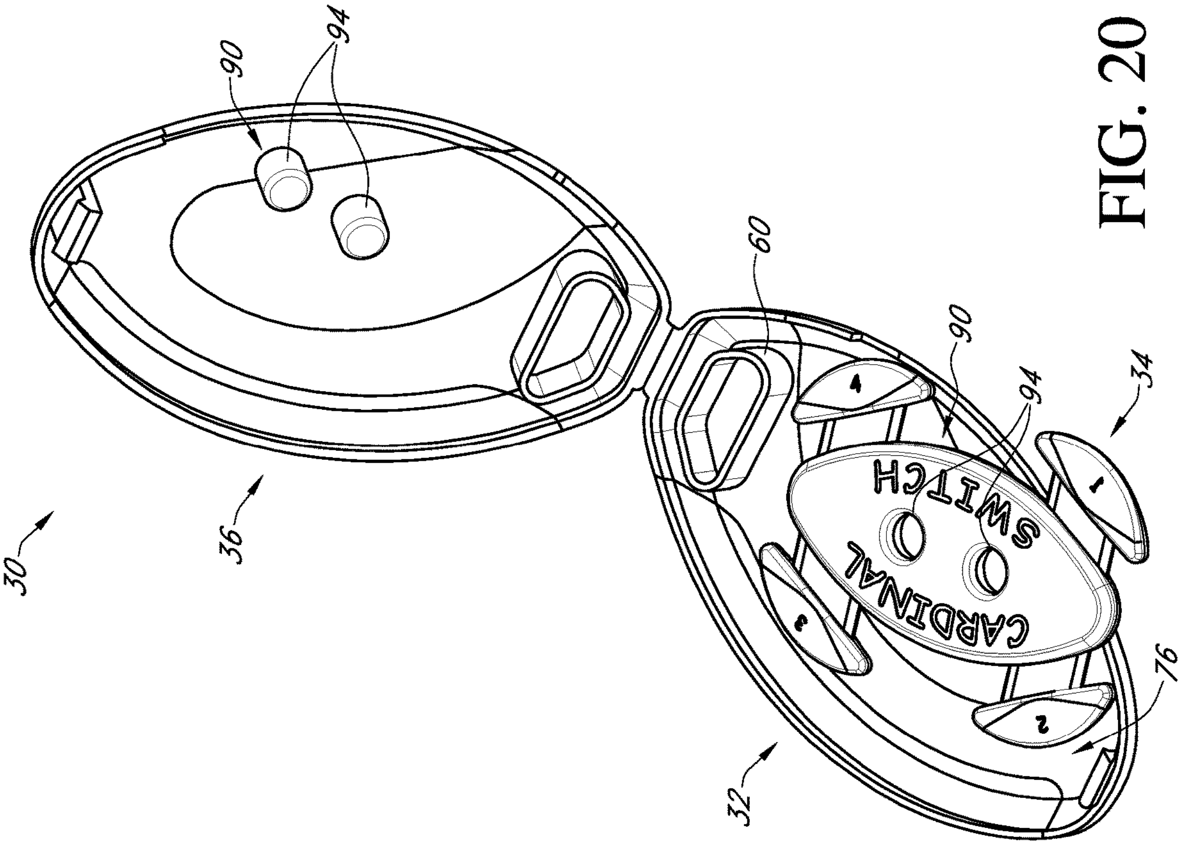
FIG. 20 is a perspective view of a third embodiment of a handheld safety knife having an oval shape, a hinged cover, a pair of cylindrical posts located on the handle, and a pair of cylindrical posts located on the cover.
Figure 21:
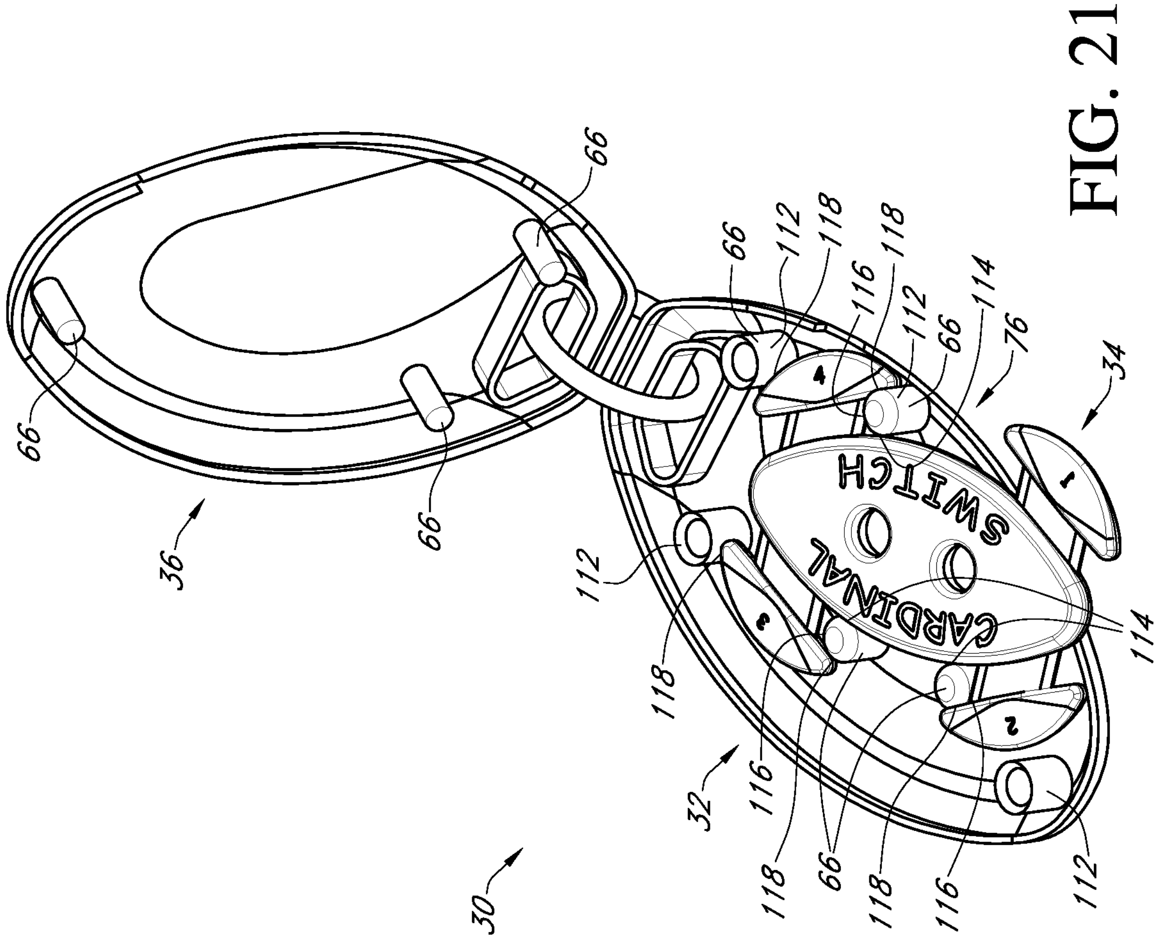
FIG. 21 is a perspective view of a third embodiment of a handheld safety knife having an oval shape, a hinged cover, and six anti-rotation protrusions.

Additional design variations of the handle 32 are shown in FIGS. 16-21. FIG. 16 shows a model with a shorter handle 32, which is sized to fit into a user’s palm. FIG. 17 takes this model and adds an end cap 62 with a retention hole 60, which allows this smaller unit to be attached to a keychain, or retractable lanyard. FIGS. 18-20 show an oval shaped embodiment 64 of the handle which eliminates the shaft portion of the handle 32 entirely in order to minimize the size of the handle. In this oval shaped embodiment 64, the cover 36 forms roughly one half of the safety knife 30. The cover 36 may be pivotably attached to the handle 32 as shown in FIG. 20, hingedly attached as shown in FIG. 21, or simply fit together with retention posts 66. The shape of the handle may be further varied beyond the embodiments depicted, so long as the handle 32 provides a safe location for the end user to grip the safety knife 30 while using the blade cartridge 34 to cut material.

The Blade Cartridge

The purpose of the blade cartridge 34 is to provide a cutting edge 46 extending from the handle 32. This cutting edge 46 should not be accessible to the end user, even when the blade cartridge 34 is being removed or exchanged for a new blade 40. The blade cartridge 34 does this by providing at least one blade 40 having at least one cutting edge 46 extending from the cartridge body 38. The end of the blade 40 preferably contains a blade guard 42 to protect the end user from the cutting edge 46. The space located between the cartridge body 38 and the blade guard 42 along the blade 40 forms the cutting channel 44, which is sized to prevent the end user's finger from contacting the cutting edge 46 and serves to guide material to be cut to the cutting edge 46.

In many of its preferred forms, the blade cartridge 34 will comprise multiple cutting edges 46, as well as multiple cutting channels 44. The cover 36 is preferably arranged in order to cover the cutting channels 44 which are not in use. This arrangement allows for push-pull cutting and allows for removal and replacement of the blade cartridge 34 in different orientations in order to exchange a used blade for a fresh one. While the cartridge is removable from the handle, one feature of this exchange is that the blade 40 is not removed from the blade cartridge 34. This allows a blade exchange to occur without exposing the end user to additional risk of cutting themselves. One further advantage of the blade cartridge 34 is that the material used to construct the blade cartridge is minimized in comparison to that of prior art designs. This allows the blade cartridge 34 to be discarded and the handle 32 portion reused or recycled without having a dissimilar material present in the recycling process.

One preferred form of the blade cartridge 34 is shown in FIGS. 1-6 and FIGS. 9-15 and is depicted as has four fixed blades 40 extending from the cartridge body 38, all of which are co-planar. This particular form of cartridge is manufactured by molding plastic overtop of two longer, and preferably pre-sharpened blades. The molded portion then forms the cartridge body 38 and covers the middle portion of each blade 40 thereby creating forming four individual blade portions. As part of this molding process, blade guards 42 may be formed on the ends of each blade 40. By spacing the blade guard 42 away from the cartridge body 38, a cutting channel 44 may be formed and is, as previously noted, sized to prevent a user's finger from being inserted far enough in the channel to contact the blade's cutting edge 46. In this embodiment the blades are metallic and comprised of either stainless steel or carbon steel, however other materials that can hold a cutting edge are considered compatible with this invention and include both ceramic and plastic blades. If using plastic blades alone, the entirety of the blade cartridge may be molded.

Optional Blade Structures and Bridged Blade Guards

Number of blades—While the form of the blade cartridge 34 shown in FIGS. 1-6 and FIGS. 9-15 comprises four blades 40, alternate forms of the blade cartridge 34 are also envisioned and may include blade cartridges having additional or fewer blades. For instance, a basic elliptical shaped cartridge might only contain a single blade, while a triangular shaped cartridge may comprise three blades.

Shape of the blades—The types and shapes of the cutting edge 46 may be varied. For instance, serrated edges, edges with uneven bevels, curved or hooked blades are all compatible with the blade cartridge 34. One embodiment of a hooked blade, may even have the hook's interior cutting edge 46 made narrow enough to prevent a finger's contact with the cutting edge 46. This hooked blade design would not require a blade guard 42 to remain safe.

Bridged Blade Guards—Other designs may alter the form of the blade guard 42 to have the blade guard lie in connection with the cartridge body 38 via a material bridge. A material bridge serves to support the blade 40 and better anchor the blade guard 42 to the cartridge body 38. One form of a material bridge adds additional support material along the middle portion of a blade 40 having two cutting edges 46. The additional material is shaped to be thickest along the centerline of the blade and tapers away as it approaches the cutting edges 46. This arrangement prevents material from binding in the cutting channel 44 when it passes over the additional support material.

Further embodiments may relocate the additional support material to one side of the blade 40. These embodiments typically comprise only one cutting edge 46, wherein the additional support material is located on the side opposite the cutting edge 46. One such example would include a film cutter where the blade guard 42 and the cartridge body 38 are attached by a hook shaped structure which forms a "U" or "C" shape around a blade 40 having a single cutting edge 46. This shape is most useful in providing a robust structure supporting the blade 40 and is predominantly used in cutting foam, stretch wrap, ribbon, twine, belts, or other difficult to cut items.

Optional Shapes for the Cartridge Body

The shape of the cartridge body 38 may be formed into alternate shapes such as rectangular, circular, or triangular, however it is preferable that the body's shape be chosen such the cutting channel 44 guides material into the cutting edge 46. One preferred form of the cartridge body 38 is an elliptical shape 68, which assists material into the cutting channel 44. In the depicted embodiment, this elliptical shape 68 sets the cutting channel 44 at an approximately 45-degree angle to the cutting edge 46. This cutting angle 70 can be further adjusted through the selection of different dimensions for the elliptical shape 68 in order to alter the angle of the cutting edge 46 relative to the cutting channel 44. The blade guards 42 themselves may also additionally comprise tapered geometry 72, which aids the blade guard to slip in between box flaps and directs material into the cutting channel 44.

Figure 3:
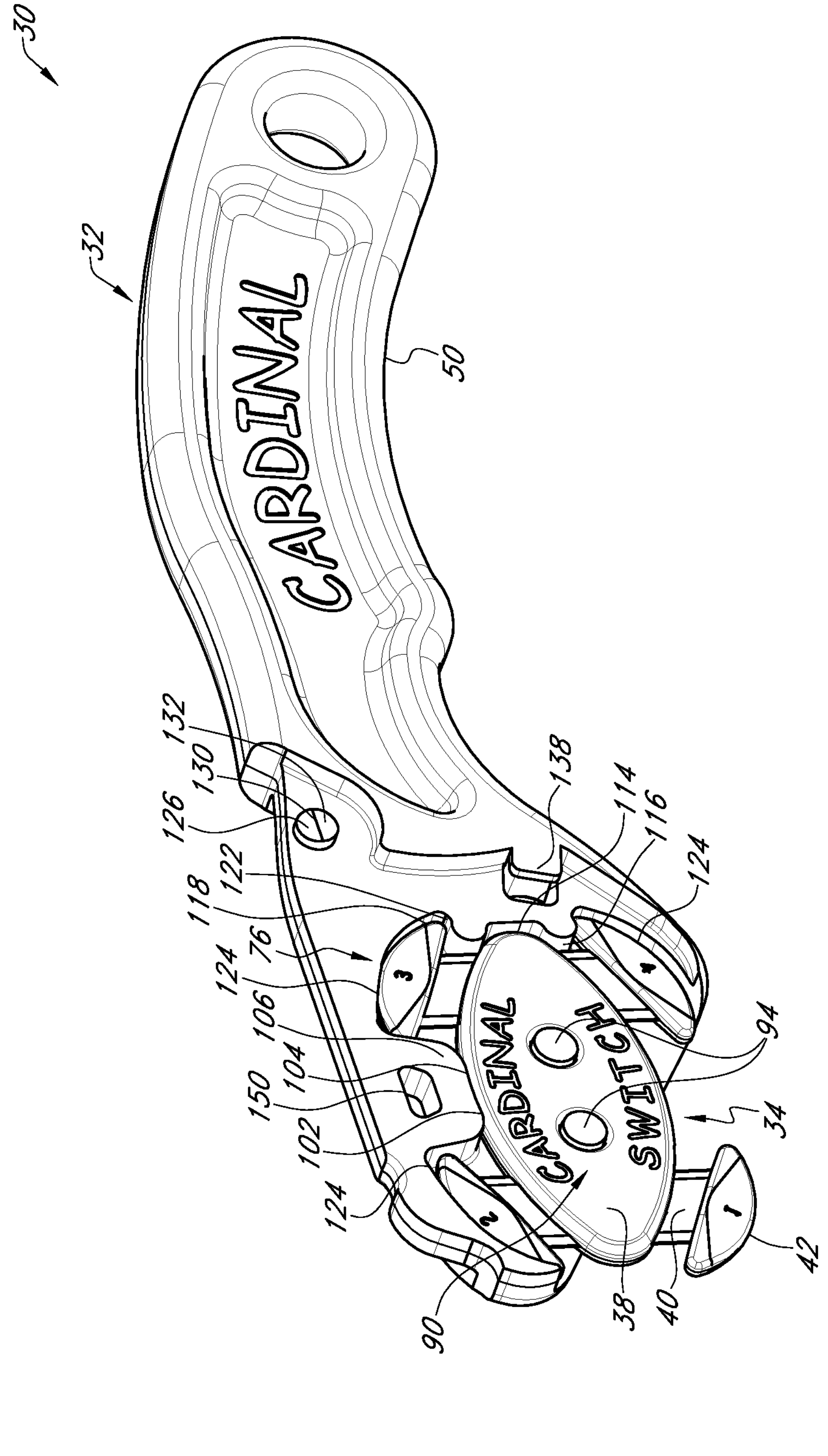
FIG. 3 is a front perspective view of the handheld safety knife shown in FIG. 1, but shown without the optional cover.

FIG. 3 shows one preferred form of the handle 32 with its cover 36 removed. FIG. 1 shows the same safety knife 30 with the cover 36 attached to the handle 32. As shown in both figures, the blade cartridge 34 in this design only has a single blade 40 extending from the handle 32 as the cover 36 occludes the remaining three blades of this design. For convenience, this blade cartridge 34, having four blades, is numbered 74, 1-4 in order to differentiate the four individual cutting channels 44. This assists the end user in determining the next unused blade, should the end user decide to use them in numerical order.

The Handle's Retention Features

Figure 7:
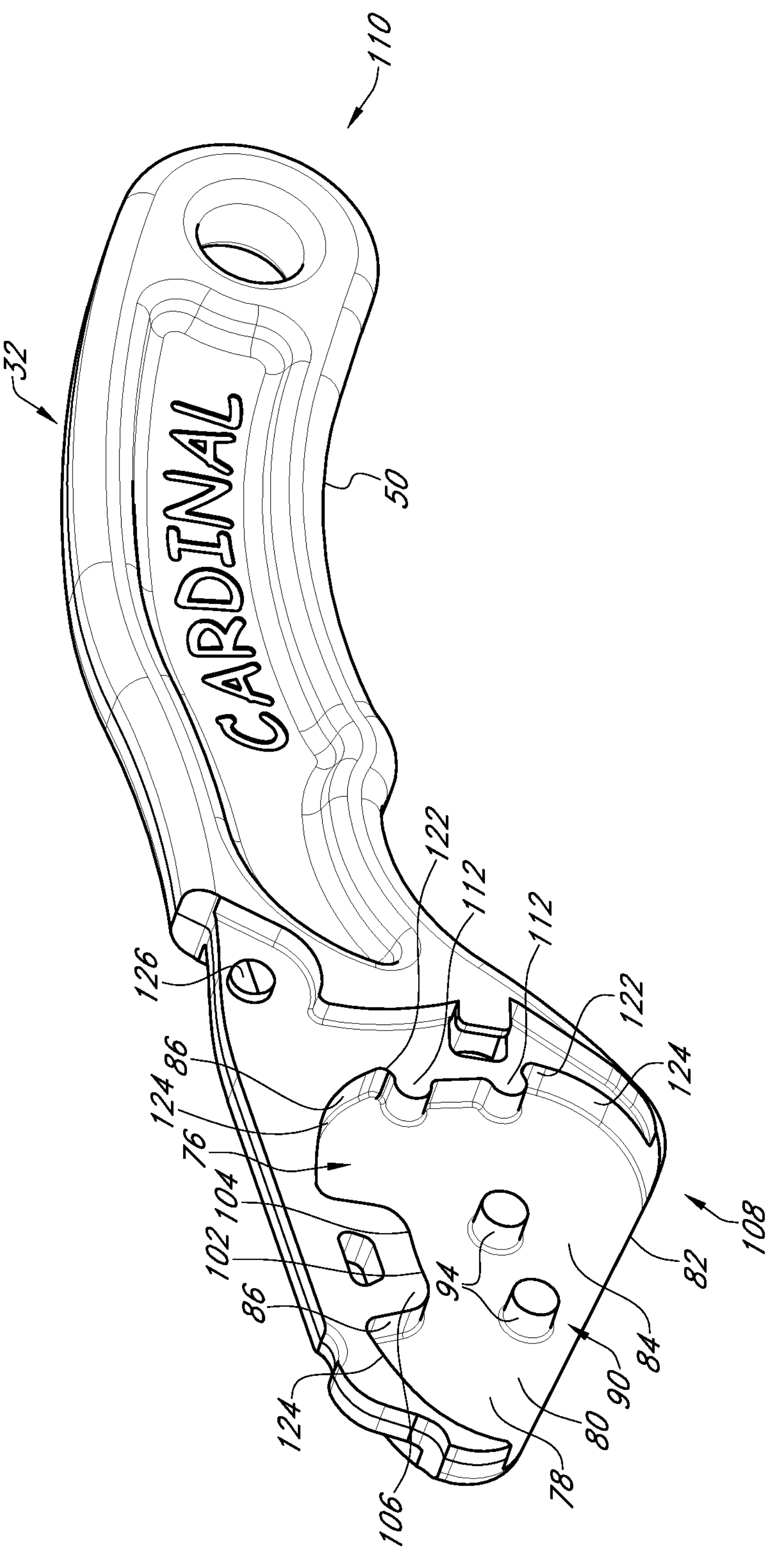
FIG. 7 is a front perspective view of a first form of the handle.
Figure 8:
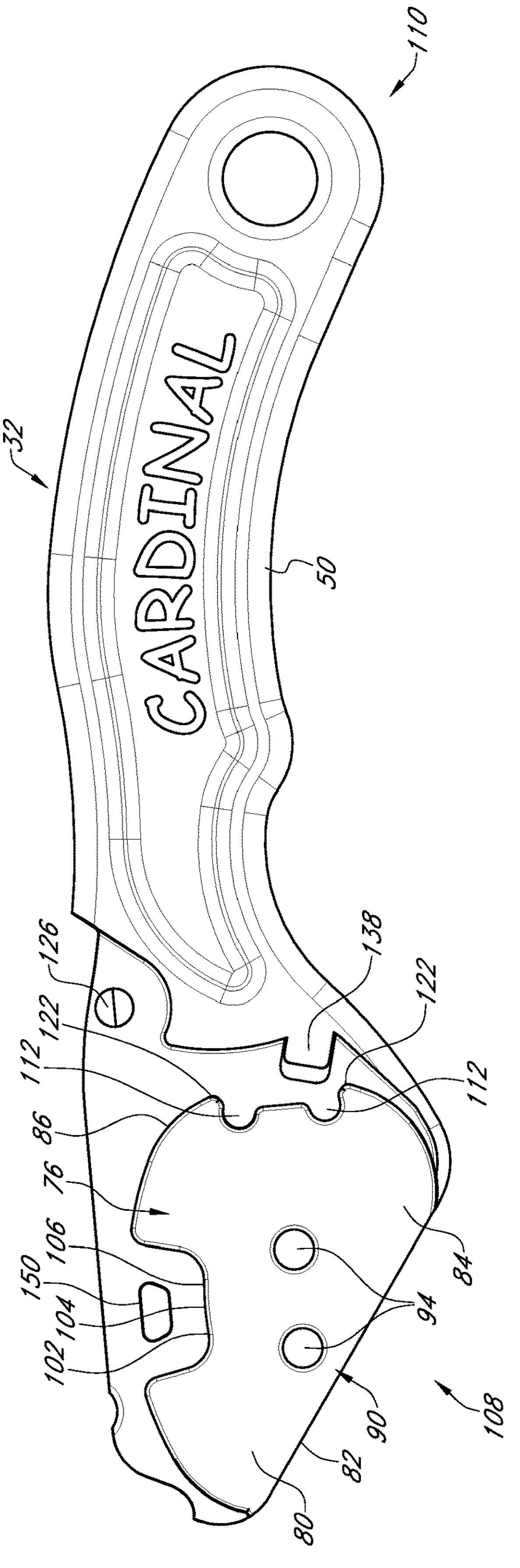
FIG. 8 is a front view of a first form of the handle.
Figure 9:
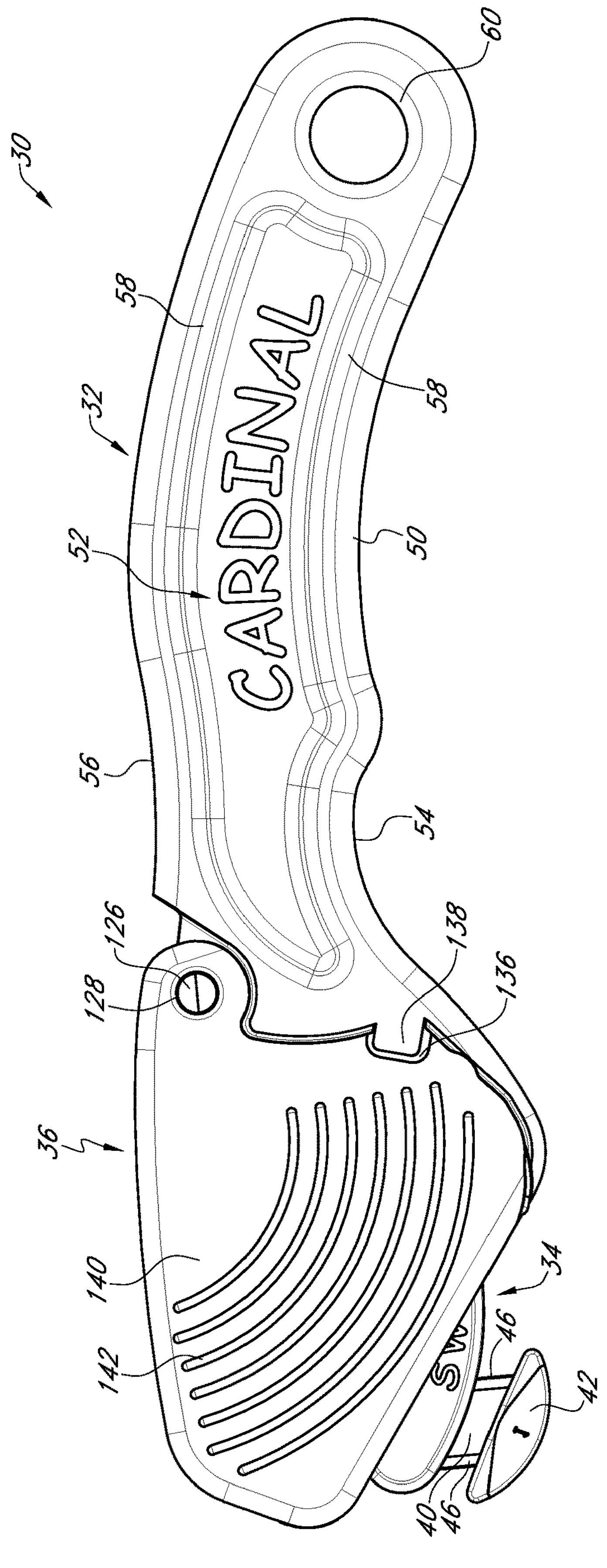
FIG. 9 is a front view of the handheld safety knife shown in FIG. 1.
Figure 10:
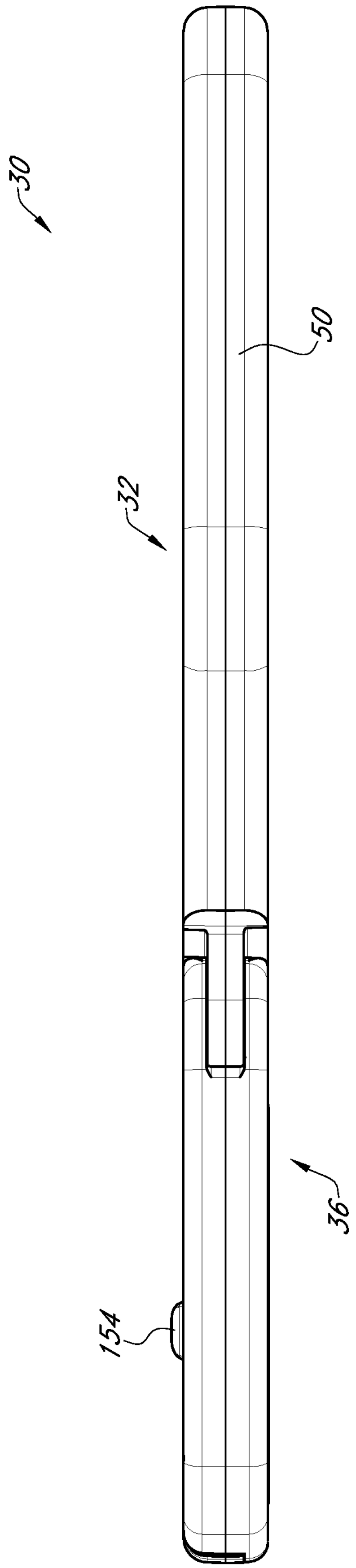
FIG. 10 is a top view of the handheld safety knife shown in FIG. 1.
Figure 11:
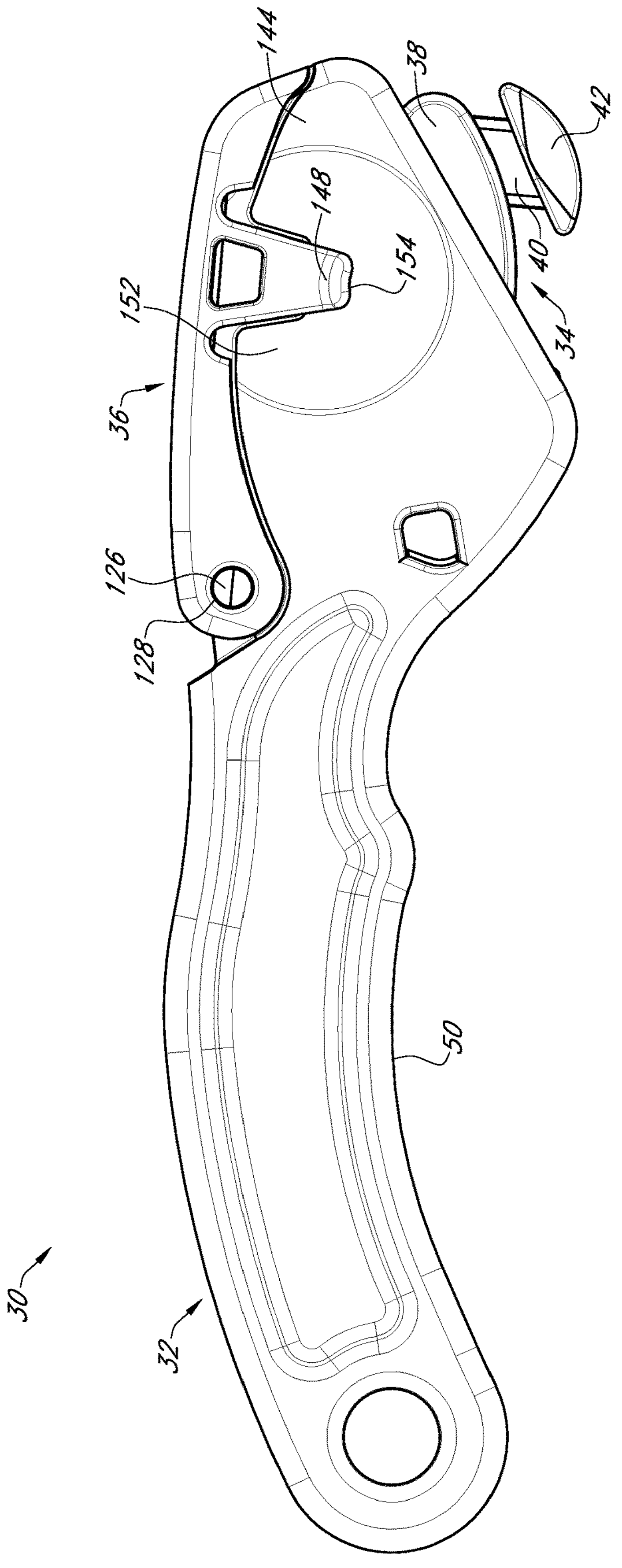
FIG. 11 is a rear view of the handheld safety knife shown in FIG. 1.
Figure 12:
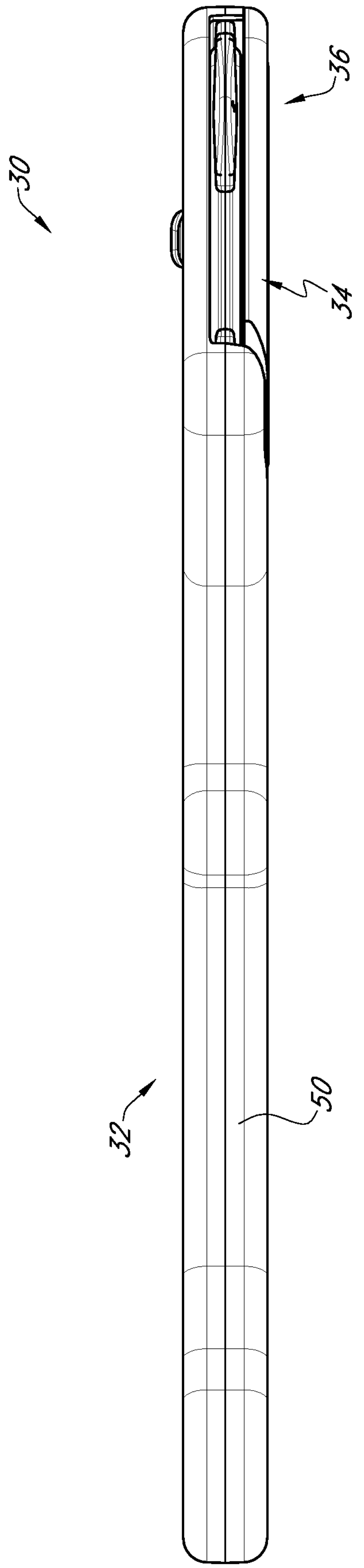
FIG. 12 is a bottom view of the handheld safety knife shown in FIG. 1.
Figure 13:
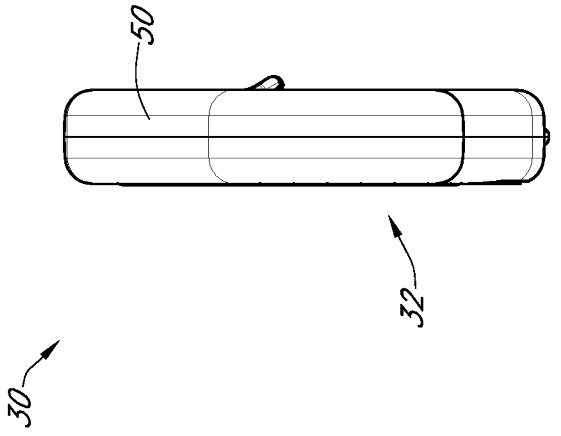
FIG. 13 is a right-side view of the handheld safety knife shown in FIG. 1.
Figure 14:
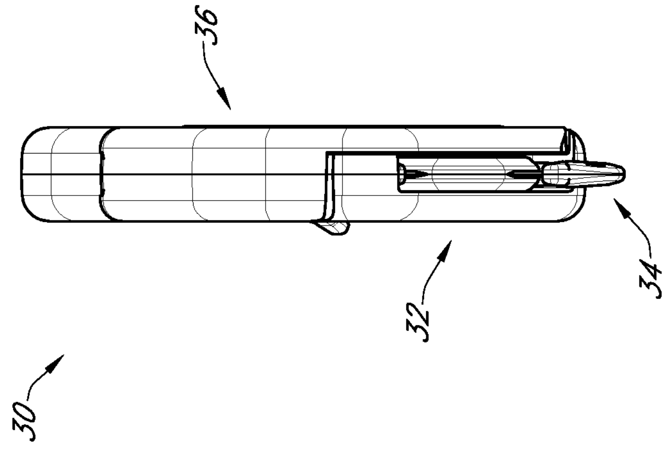
FIG. 14 is a left-side view of the handheld safety knife shown in FIG. 1.
Figure 15:
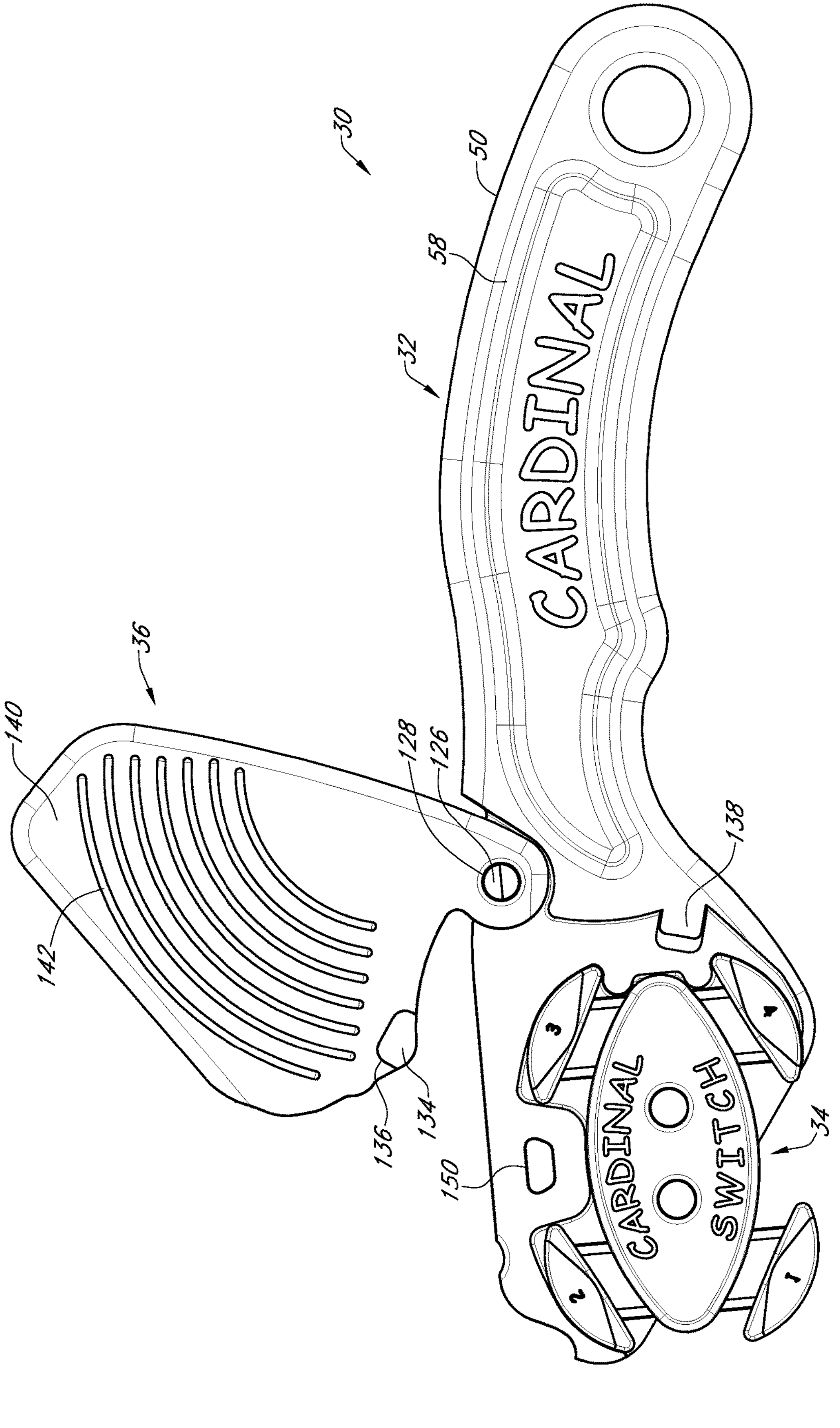
FIG. 15 is a front view of the handheld safety knife shown in FIG. 1 with the cover in the open position.

The blade cartridge 34 is retained by the handle 32 in several ways which principally concentrates around the use of a cartridge recess 76 located in the handle 32. The form of the cartridge recess shown in FIGS. 3, 4, 7, and 8 is depicted as having a base surface 78, located in a depression 80 on the front portion 82 of the handle 32. The depression 80 in the cartridge recess 76 is preferably flat, forming a plane 84 which engages a side portion 88 of the blade cartridge 34 and aids in cartridge retention to the handle while allowing at least one blade 40 of the blade cartridge to extend beyond the cartridge recess 76 of the handle 32. The cartridge recess 76 may further contain one or more side walls 86. In the form of the invention shown best in FIGS. 3 and 7, the cartridge recess 76 is sized to match or exceed the size and shape of the blade cartridge 34 and functions to retain the blade cartridge in one or more of the following ways:

A first form of retention of the blade cartridge 34 to the handle 32 is best shown in FIGS. 7, 19 and 20, wherein the cartridge recess 76 further comprises an orientation feature 90 protruding from the handle 32. The orientation feature 90 is sized to fit within with a similarly located cavity 92 (FIG. 5) placed into the blade cartridge 34. In the form of the invention shown in FIGS. 7, 19 and 20, the orientation feature 90 is depicted as two cylindrical posts 94. The similarly shaped cavity 92 in the cartridge is depicted as two cylindrical holes 96 placed through the cartridge body 38 of the blade cartridge 34 (See FIG. 5). This cavity 92 in the cartridge body 38 may further comprise a taper, chamfer, or a small radius 100 on one or more edges to assist with the assembly of the cartridge to the orientation feature 90. The shape and location of the orientation feature 90 on the handle 32 is not limited to just the two-post embodiment shown in the Figures, but may include alternate shapes such as fewer or additional posts, posts shaped in other geometrical shapes other than cylinders (rectangles, squares, triangles, stars, etc.), posts which are located further apart (or closer to one another), posts located in both the handle 32 and the cover 36 (See FIG. 20), and even includes the potential for inversion of the features so that the protruding orientation feature 90 is located on the cartridge body 38 and the cavity 92 is relocated onto the handle 32.

Additionally, the orientation feature 90 may optionally be sized or modified to assist in the retention of the blade cartridge 34 to the handle 32 by sizing the orientation feature 90 so that at least one portion of orientation feature 90 lies in direct contact with the cavity 92. This contact between the orientation feature and the cavity may be enhanced through the use of an engineered fit, such as a press or interference fit, or may include the addition of one or more features such as mushroom shaped heads, snap locks, or even a plastic or deformable coating placed on a portion of the orientation feature 90. The goal being to increase and maintain the contact between the orientation feature 90 and the cavity 92, thereby aiding the retention of the blade cartridge 34 within the handle's cartridge recess 76.

A second form of retention between the blade cartridge 34 and the handle 32 may be gained by having at least one portion of the side wall contain a complimentary contour 102 which is similar to the shape of at least a portion of the cartridge body 38 (here an elliptical shape 68). In the embodiment shown in FIGS. 3 and 4, a portion of the side wall is formed to create a support surface 104 which is roughly "U" shaped 106, wherein the base of the U shape is contoured to compliment the blade cartridge, and the upper portions of the "U" shape are placed adjacent to the blade guards 42 to limit the translation of the cartridge to the front 108 and rear 110 of the handle, as well as to prevent its rotation on the plane 84 formed by the base surface 78.

Figure 4:
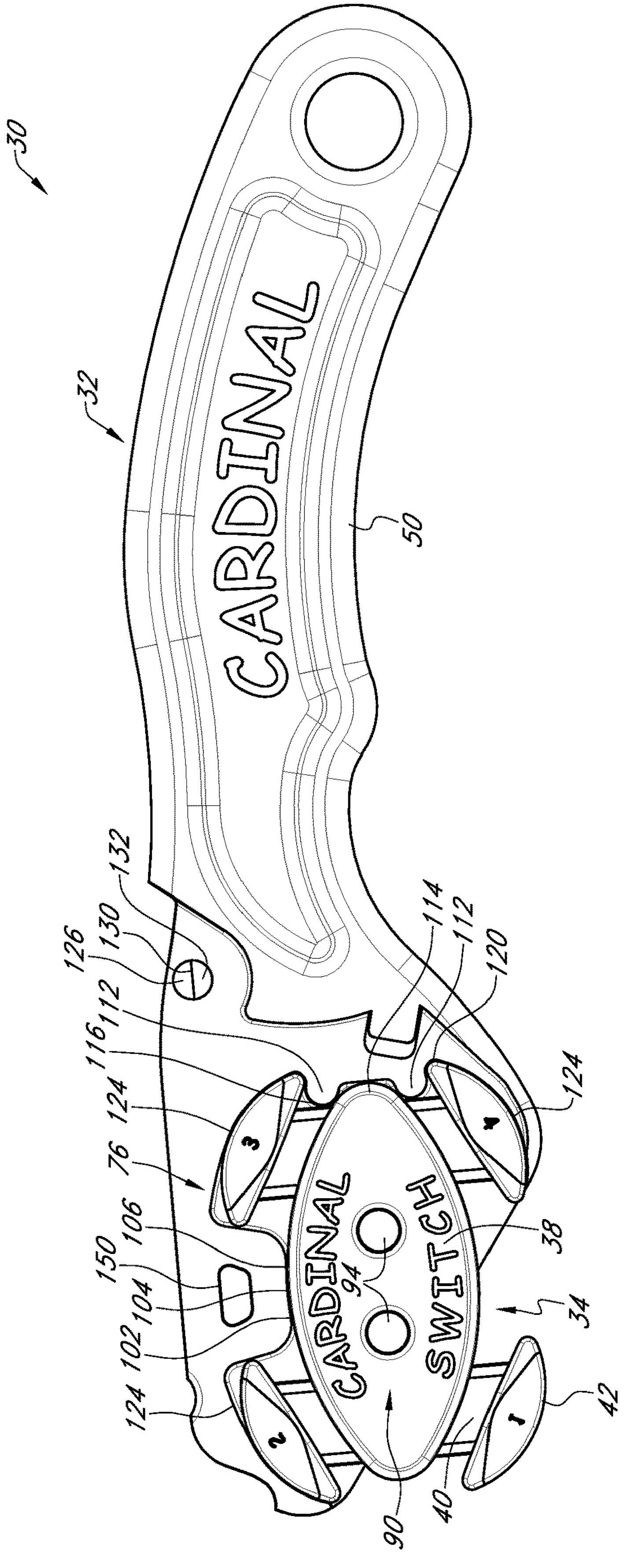
FIG. 4 is a front view of the handheld safety knife shown in FIG. 3.
Figure 5:
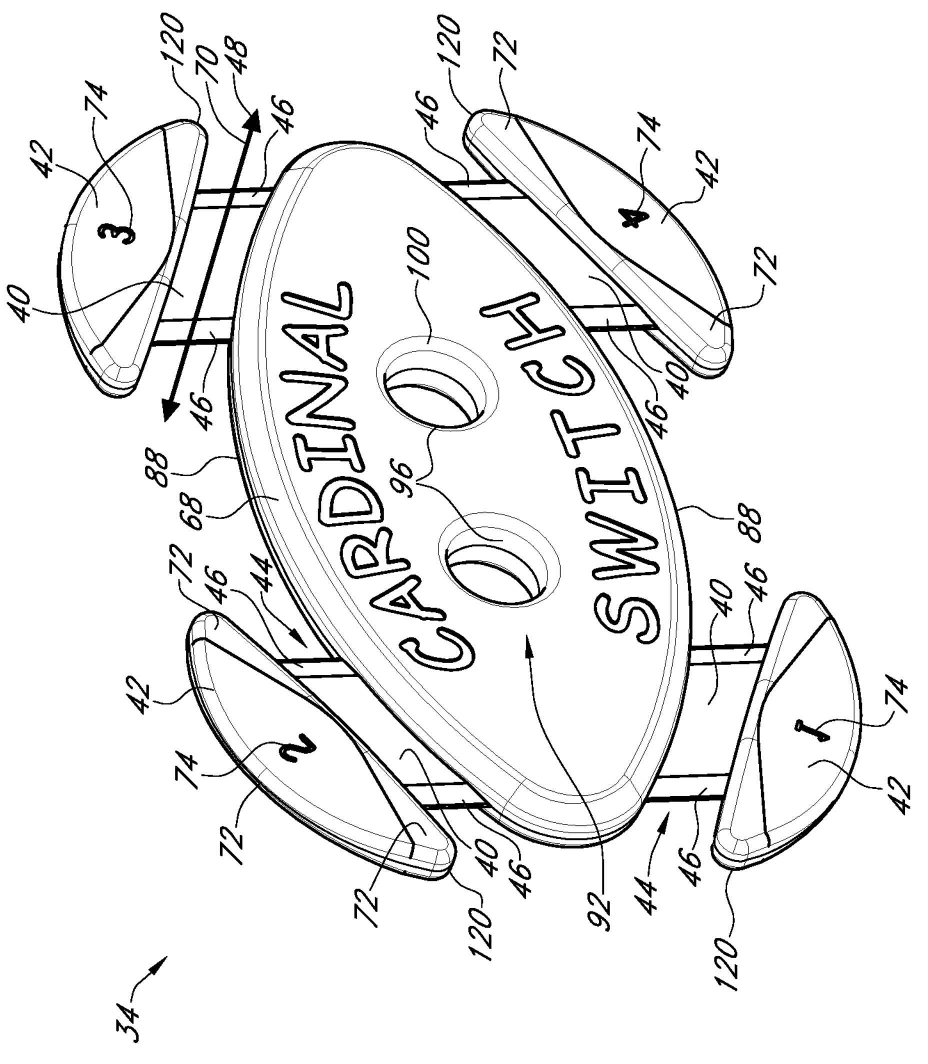
FIG. 5 is a perspective view of one embodiment of a blade cartridge for use with the handheld safety knife.
Figure 6:
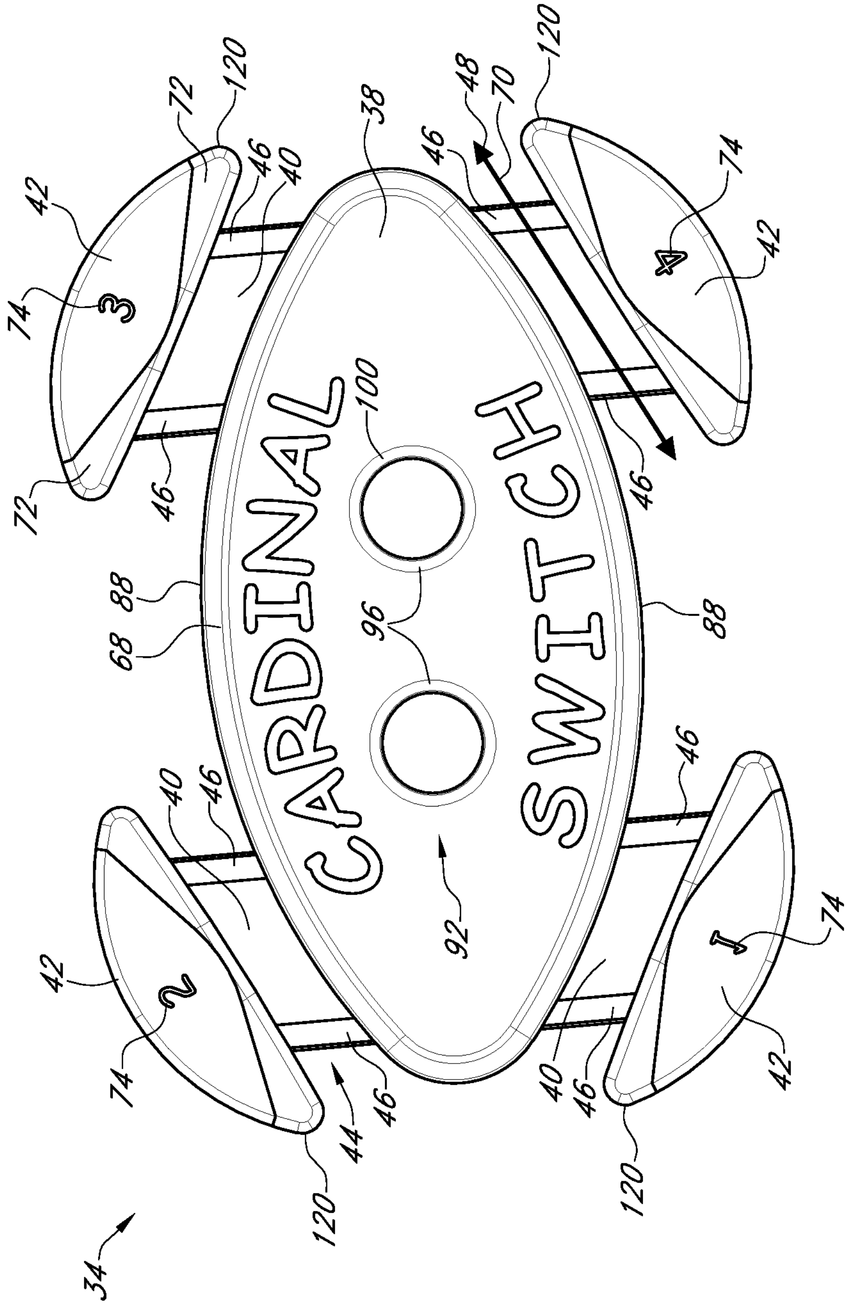
FIG. 6 is a front view of the blade cartridge shown in FIG. 5.

A third form of retention is best seen in FIGS. 4 and 21, and involves a plurality of anti-rotation protrusions 112 formed in, or extending from, the handle's cartridge recess 76. These anti-rotation features are preferably cylindrical in shape, and are intended to engage the blade cartridge 34 to preventing its translation or rotation on the plane 84 formed by the base surface 78. Retention of the blade cartridge 34 may be achieved through various forms of contact (114, 116, and 118), which are described as follows: The first form of contact 114 is created by the anti-rotation protrusion's 112 engagement of at least one surface of the cartridge's body 38. The second form of contact 116 is created by the anti-rotation protrusions 112 engagement of at least one blade 40. The third form of contact is created where the anti-rotation protrusions 112 engages at least one blade guard 42. In a preferred form, this third point of contact engages the blade guard's tips 120 in a manner that forms an undercut 122 in the anti-rotation protrusions 112 preventing the cartridge from translating in the front 108 to rear 110 directions. These three forms of contact with the anti-rotation protrusions 102 act to fully restrain the blade cartridge 34 to the handle 32.

Figure 22:
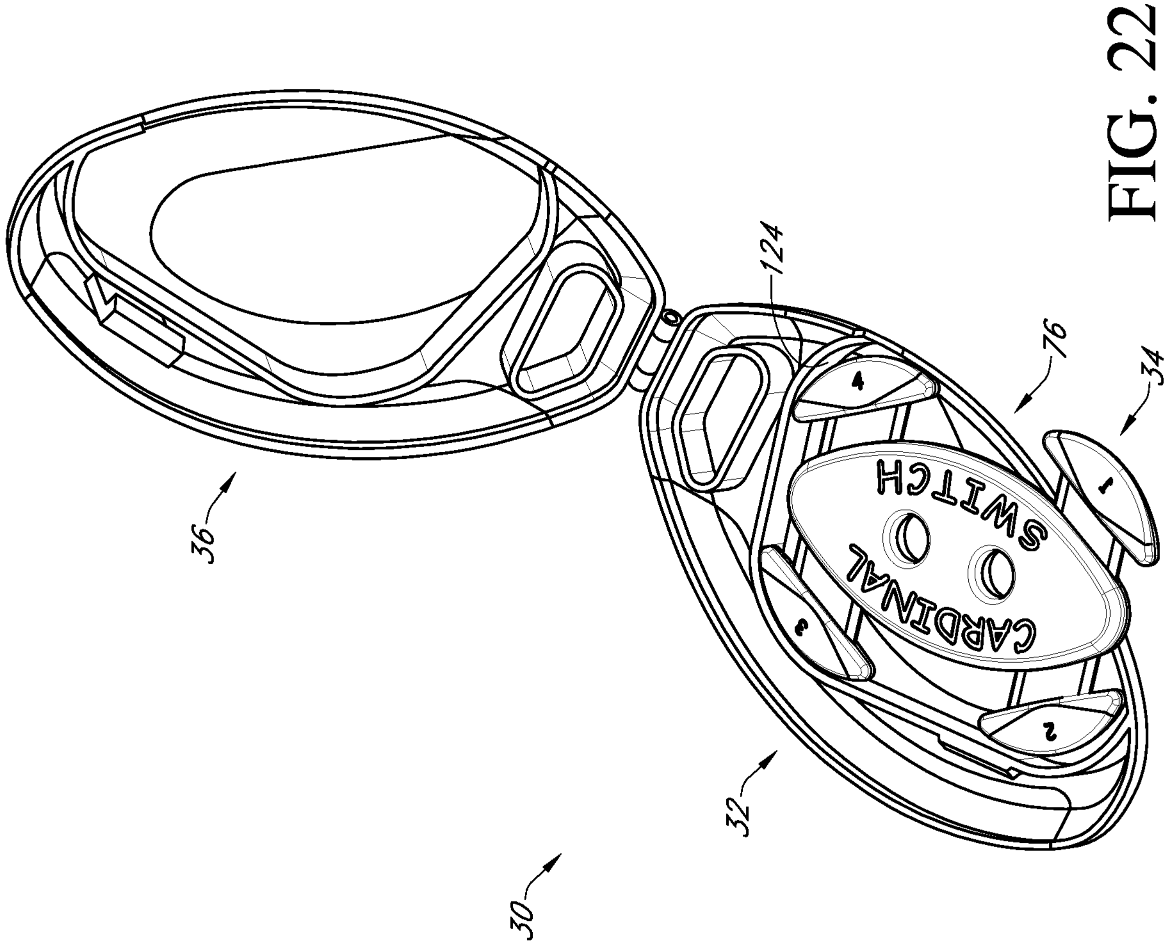
FIG. 22 is a perspective view of a third embodiment of a handheld safety knife having an oval shape, a hinged cover, and a shaped side wall forming a pocket.

A fourth form of retention for the blade cartridge 34 to the handle 32 is shown in FIGS. 4 and 22 and is gained by shaping a portion of the side wall 86 to form a pocket 124 which is shaped to have a complimentary contour to that of one or more blade guards 42. Since the pockets 124 have a complimentary contour to the blade guards 42 it is possible to minimize the clearance between the pocket and the guard, causing the blade cartridge 34 to be retained to the handle 32 and resisting planar translations and rotations. Adding additional pockets merely increases the retention, and as is best seen in FIG. 4, which in a preferred form of the invention comprises three pockets 124 which engage three of the blade cartridge's blade guards 42 thereby increasing the strength of the assembly by distributing cutting loads to the handle through multiple points of contact.

A fifth form of retention for the blade cartridge 34 to the handle 32 is found through the use of the optional cover 36 which prevents movement of the blade cartridge normal to the plane 84 of the base surface 78 of the cartridge recess 76 when the cover is closed. Additional detail on the cover will presented in the next section.

The aforementioned means of retention may be used singularly, or on conjunction to retain a blade cartridge 34 to the handle 32. The designs shown in Figures are merely exemplary, and the number of retention features, their shape, and placement may be modified as needed to accommodate varying geometries and features of the alternate forms of the blade cartridge 34.

The Cover:

The optional cover 36 attaches to the handle 32 and assists with the retention of the blade cartridge 34. In the embodiment shown in FIGS. 1, 2 and 19, the cover is pivotally attached between an axial support 126 located on the handle 32 and a corresponding receiving hole 128 located on the cover 36. Ideally, the end portion 130 of the axial support 126 contains a capture feature 132 such as a snap-lock style feature, a mushroom shaped head, a rivet, a nut, or other such fastener known in the art to retain the cover on the handle once assembled. This arrangement allows the cover 36 to be pivoted open (See FIG. 15) to remove and exchange the blade cartridge 34.

To further assist with the cover's 36 alignment with the handle 32 when closed, in the embodiment depicted in the FIG. 1, a support surface 134 may be placed onto a lower portion 136 of the cover 36. This support surface 134 engages a support tab 138 located on the handle 32. The support surface 134 and the support tab 138 interact and engage with one another to align the cover 36 with the handle 32 when the cover is closed. The front face 140 of the cover 36, may also include a textured feature 142 on the front face 140 of the cover 36 allowing it to be better gripped by the end user.

Figure 2:
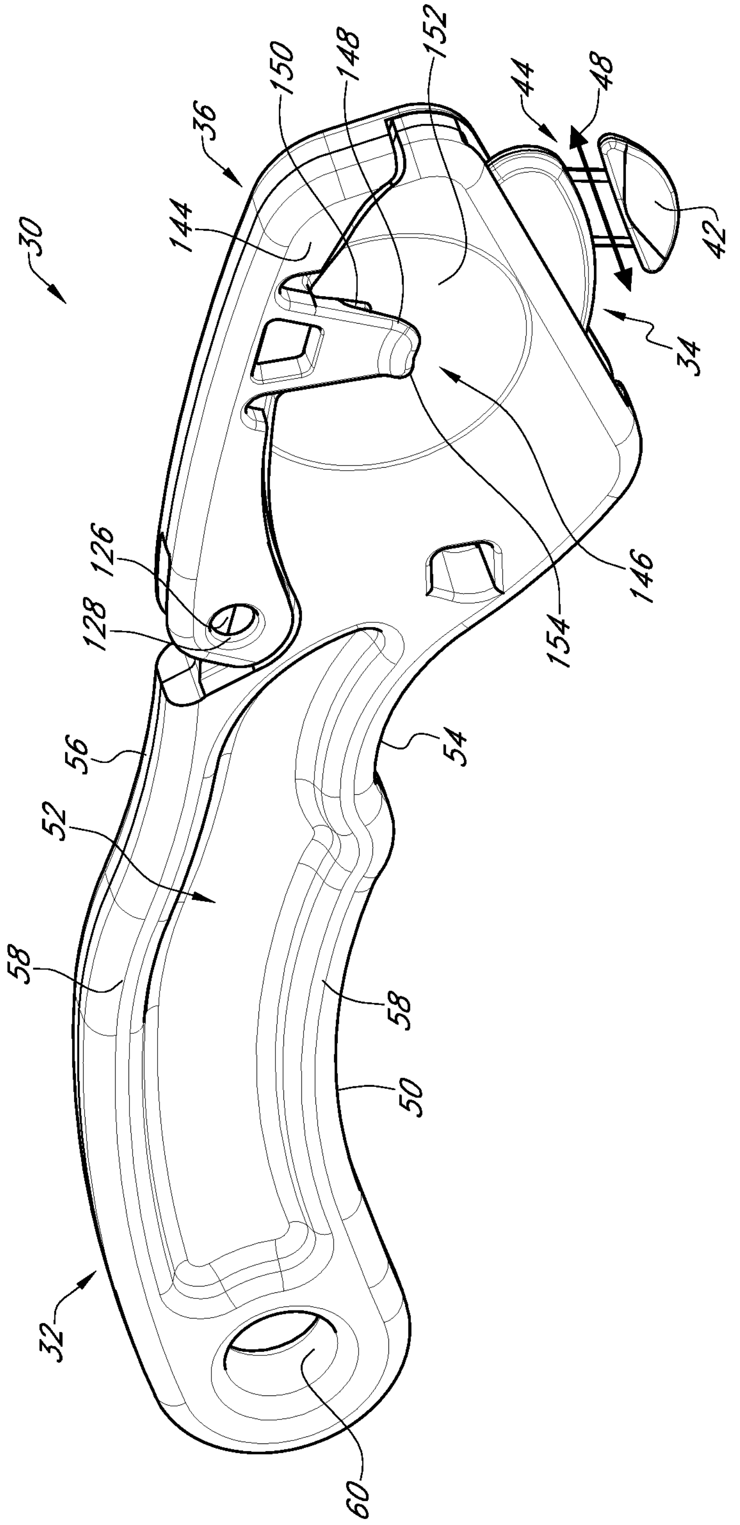
FIG. 2 is a rear perspective view of the handheld safety knife shown in FIG. 1.

Additionally, in the embodiment shown in FIG. 2, the rear surface 144 of the cover 36 may also include a retention mechanism 146, such as a locking tab 148 which engages a receiving window 150 located on the rear surface 144 of the handle 32 to ensure the cover 36 remains closed. A recess 152 may also be included on the rear surface 144 of the handle 32 allowing an end user to better access the retention mechanism 146, preferably by lifting the end portion 154 with their finger.

Changing the Blade Cartridge:

In order to change the blade cartridge, the optional cover 36, if present, is opened and the blade cartridge 34 is removed from the handle 32, typically by lifting it from the cartridge recess 76. The blade cartridge 34 may then be replaced with a new cartridge, or reoriented to use one of the other blades from the blade cartridge 34, should multiple blades are present on the blade cartridge. In the embodiment of the blade cartridge 34 shown in FIGS. 5 and 6, which includes four-blades, the cartridge is numbered 74 1-4 in order to differentiate the four blades 40 from one another. This assists the end user in determining the next blade to use, should the user decide to use them in numerical order.

Once the end user selects the blade 40 of their choice the blade cartridge 34 is reinserted into the handle's cartridge recess 76 and the optional cover 36 is then closed. The safety knife 30 is now ready for use. Of note, the entire time the cover was open and the blade cartridge 34 was exposed, the end user was not at an increased risk of being injured due to the construction of the blade cartridge 34. This is one key advantage of the inventive system over that of the prior art.

The above description is considered that of the preferred embodiments only. Modifications to the invention will occur to those skilled in the art and those who make use of the invention. Therefore, it is understood that the embodiments shown in the drawings and the examples set forth herein are described merely for illustrative purposes, and are not intended to limit the scope of the invention as interpreted according to the principles of patent law, including the doctrine of equivalents.

The invention claimed is:

1. A handheld safety knife comprising:

a removable blade cartridge having a cartridge body, a first fixed blade, and a second fixed blade;

a handle having a cartridge recess with a planar base surface;

wherein said removable blade cartridge is retained in said cartridge recess and rests upon said planar base surface;

wherein said first fixed blade and said second fixed blade are co-planar;

wherein said removable blade cartridge has a first blade guard located at an end portion of said first fixed blade thereby forming a cutting channel with said cartridge body;

wherein said first fixed blade extends away from said handle when said removable blade cartridge is installed and wherein access to said second fixed blade is prevented.

2. The handheld safety knife as defined in claim 1, wherein said first fixed blade has a first cutting edge on a first side of said cutting channel, and a second cutting edge located on a second opposite side of said cutting channel.

3. The handheld safety knife as defined in claim 2 wherein said first blade guard further comprises: tapered geometry on said first side and said of said cutting channel second opposite side.

4. The handheld safety knife as defined in claim 1, wherein said removable blade cartridge has a third fixed blade and a fourth fixed blade;

wherein said first fixed blade, said second fixed blade, said third fixed blade and said fourth fixed blade are all co-planar; and wherein said handle prevents access to at least one of: said second fixed blade, said third fixed blade, and said fourth fixed blade, when said removable blade cartridge is installed.

5. The handheld safety knife as defined in claim 4, wherein:

a second blade guard is located at an end portion of said second fixed blade;

a third blade guard is located at an end portion of said third fixed blade; and a fourth blade guard is located at an end portion of said fourth blade.

6. The handheld safety knife as defined in claim 5, wherein said cartridge recess further comprises:

a side wall forming a pocket having a complimentary contour to at least one of: said second blade guard, said third blade guard; and said fourth blade guard; and wherein said pocket lies adjacent to said planar base surface and in contact with at least one of: said second blade guard, said third blade guard; and said fourth blade guard.

7. The handheld safety knife as defined in claim 5, wherein said cartridge recess further comprises a plurality of anti-rotation protrusions which engage at least one of: said second blade guard, said third blade guard; and said fourth blade guard.

8. The handheld safety knife as defined in claim 7, wherein said plurality of anti-rotation protrusions also engage said cartridge body.

9. The handheld safety knife as defined in claim 7, wherein said plurality of anti-rotation protrusions also engage at least one of: said second fixed blade, said third fixed blade, and said fourth fixed blade.

10. The handheld safety knife as defined in claim 7, wherein said plurality of anti-rotation protrusions also engage said cartridge body; and wherein said plurality of anti-rotation protrusions also engage at least one of:

said second fixed blade, said third fixed blade, and said fourth fixed blade.

11. The handheld safety knife as defined in claim 5, further comprising a cover pivotably attached to the handle.

12. The handheld safety knife as defined in claim 11 further comprising:

a first number placed onto said first blade guard and used to identify said first fixed blade;

a second number placed onto said second blade guard and used to identify said second fixed blade;

a third number placed onto said third blade guard and used to identify said third fixed blade;

a fourth number placed onto said fourth blade guard and used to identify said fourth fixed blade; and wherein at least one of: said first number, said second number, said third number, or said fourth number is visible when said removable blade cartridge is installed and said cover is closed.

13. The handheld safety knife as defined in claim 4, wherein said cartridge recess further comprises a plurality of anti-rotation protrusions which engage said cartridge body.

14. The handheld safety knife as defined in claim 13, wherein said plurality of anti-rotation protrusions also engage at least one of: said second fixed blade, said third fixed blade, and said fourth fixed blade.

15. The handheld safety knife as defined in claim 4, wherein said cartridge recess further comprises a plurality of anti-rotation protrusions which engage at least one of: said second fixed blade, said third fixed blade, and said fourth fixed blade.

16. The handheld safety knife as defined in claim 1, wherein said cartridge body has an elliptical shape allowing for its removal, reorientation, and replacement into said cartridge recess; and;

and wherein said elliptical shape sets a cutting angle.

17. The handheld safety knife as defined in claim 1, wherein:

said cartridge recess further comprises a cartridge orientation feature;

said cartridge body further comprises at least one cavity; and wherein said cartridge orientation feature is sized to mate with said cavity.

18. The handheld safety knife as defined in claim 17, wherein said cartridge orientation feature is two cylindrical posts and wherein said cavity is two cylindrical holes.

19. The handheld safety knife as defined in claim 1, wherein said handle is oval shaped.

20. The handheld safety knife as defined in claim 1, further comprising a cover hingedly attached to the handle.

21. The handheld safety knife as defined in claim 1, further comprising a cover retained on said handle via a plurality of retention posts.

22. A handheld safety knife comprising:

a removable blade cartridge having a cartridge body and at least one fixed blade;

a handle having a cartridge recess retaining said removable blade cartridge;

wherein said fixed blade extends away from said handle when said removable blade cartridge is installed;

wherein said cartridge recess further comprises a side wall having a complimentary contour to at least a portion of said removable blade cartridge;

wherein said cartridge recess further comprises a cartridge orientation feature;

wherein said cartridge body further comprises at least one cavity; and wherein said cartridge orientation feature is sized to mate with said cavity.

23. A handheld safety knife comprising:

a removable blade cartridge having a cartridge body and at least one fixed blade;

a handle having a cartridge recess retaining said removable blade cartridge;

wherein said fixed blade extends away from said handle when said removable blade cartridge is installed;

wherein said cartridge recess further comprises a side wall having a complimentary contour to at least a portion of said removable blade cartridge;

wherein said removable blade cartridge has a blade guard located at an end portion of said fixed blade thereby forming a cutting channel; and wherein said cartridge recess further comprises a plurality of anti-rotation protrusions which engage said blade guard, said cartridge body, and said fixed blade.

24. A handheld safety knife comprising:

a removable blade cartridge having a cartridge body and at least one fixed blade;

a handle having a cartridge recess retaining said removable blade cartridge;

wherein said fixed blade extends away from said handle when said removable blade cartridge is installed;

wherein said cartridge recess further comprises a side wall having a complimentary contour to at least a portion of said removable blade cartridge;

wherein said cartridge recess further comprises a cartridge orientation feature;

wherein said cartridge body further comprises at least one cavity;

wherein said cartridge orientation feature is sized to mate with said cavity;

wherein said removable blade cartridge has a blade guard located at an end portion of said fixed blade thereby forming a cutting channel with said cartridge body; and wherein said cartridge recess further comprises a plurality of anti-rotation protrusions which engage said blade guard, said cartridge body, and said fixed blade.

25. The handheld safety knife as defined in claim 24, further comprising a cover pivotably attached to the handle.

* * * * *